US010035665B2

(12) United States Patent
Azzali

(10) Patent No.: US 10,035,665 B2
(45) Date of Patent: Jul. 31, 2018

(54) TABLE FOR ACCUMULATING FIFO ITEMS

(71) Applicant: SIPAC S.P.A., Fontevivo (IT)

(72) Inventor: Corrado Azzali, Fonteviro (IT)

(73) Assignee: SIPAC S.P.A., Fontevivo (PR) (IT)

( * ) Notice: Subject to any disclaimer, the term of this patent is extended or adjusted under 35 U.S.C. 154(b) by 0 days.

(21) Appl. No.: 15/361,735

(22) Filed: Nov. 28, 2016

(65) Prior Publication Data

US 2017/0152112 A1 Jun. 1, 2017

(30) Foreign Application Priority Data

Nov. 27, 2015 (IT) .................. 102015000077966

(51) Int. Cl.
*B65G 47/51* (2006.01)

(52) U.S. Cl.
CPC ................... *B65G 47/5131* (2013.01)

(58) Field of Classification Search
CPC .................................................. B65G 47/5131
USPC ......................................... 198/347.1, 347.4
See application file for complete search history.

(56) References Cited

U.S. PATENT DOCUMENTS 8,573,380 B2 * 11/2013 Petrovic ............. B65G 47/5131
198/347.1
2005/0263374 A1   12/2005 Beesley et al.

FOREIGN PATENT DOCUMENTS

| EP | 1 390 282 A1 | 2/2004 |
| EP | 1 632 445 A1 | 3/2006 |
| EP | 1 726 544 A1 | 11/2006 |
| EP | 2 459 472 A1 | 6/2012 |
| FR | 2 887 533 A1 | 12/2006 |
| WO | 02/072454 A1 | 9/2002 |
| WO | 2011/012802 A1 | 2/2011 |

* cited by examiner

*Primary Examiner* — Gene O Crawford
*Assistant Examiner* — Lester III Rushin
(74) *Attorney, Agent, or Firm* — Young & Thompson

(57) ABSTRACT

Table for accumulating FIFO items including a sensor S1 positioned at the upstream end of an outlet conveyor U having reading in the longitudinal direction and in proximity to an external lateral side of the conveyor, configured for intercepting the items signaling the presence thereof at a reading height Q which defines a limit reference area of the presence or absence of the items on the outlet belt U; at least one pressure sensor S2 and a presence sensor S3 placed on the outlet sides of conveyor U and of the downstream conveyor, respectively; a control unit B configured for defining the position Z of deflector V as a function of the reading measure Q of sensor S1 and of the values of sensor values S2, S3; wherein measure Q that the sensor should detect is reset by the same control unit each time it is reached by the items.

10 Claims, 3 Drawing Sheets

TABLE FOR ACCUMULATING FIFO ITEMS

FIELD OF THE INVENTION

The present invention relates to the field of systems for accumulating items or packages such as bottles, cans, glasses, and more generally containers, which pass on conveyors forming part of lines adapted for the production and/or filling and/or packaging of said items.

BACKGROUND OF THE INVENTION

The line for producing and/or filling and/or packaging containers comprise a series of conveyor belts that allow the transit of said items from a work station to another or from one machine to the next, wherein such machines (for example, blowing, filling, labeling machine, etc.) are arranged according to a sequence imposed by the production/filling/packaging process. During operation, said machines require stopping times for the reinstatement of consumables, or for short maintenance; in order to prevent these stops from creating continuous downtime of the line, thereby affecting the productivity thereof, it is often necessary to create item accumulation zones between one work station and the next, which are able to contain the items processed by the upstream machines during a stop of downstream machines. Said accumulated items are put in line at the restart of said downstream machines. Said accumulation systems are generally "FIFO", or first in first out.

Different types of accumulation tables are known; examples thereof are documents EP1390282, EP1632445, EP2459472.

The above documents describe accumulation tables comprising two flat conveyor belts, straights and side by side which move in mutually opposite direction on which movable deflector means are provided adapted to constitute a guide for the stream of the items, delimiting a transit zone of said items between the inlet and the outlet of the table that serves as a temporary storage area. The longitudinal movement of said deflector means involves an enlargement or a reduction of the area available for accumulation. Documents EP1390282 EP1632445 describe deflector means which occupy both inlet and outlet conveyors of the accumulation table, while in document EP2459472, the deflector means comprise a curved guide which extends only on the inlet conveyor of the accumulation table.

In documents EP1390282 EP1632445, the management of the position that said deflector means must take to ensure the proper accumulation or emptying of the table takes place by means of a controller which detects by sensors the number of input items and the number of output items and defines the speed of the two conveyors; the displacement of the deflector means is a function of the speeds of the two conveyors.

In document EP2459472, the management of the deflector means position is implemented by a controller which detects the signal of a sensor directed towards a movable abutment/reflector placed on the same deflector means; the position of said abutment/reflector is varied by the thrust of the bottles that act on the support means thereof.

SUMMARY OF THE INVENTION

One object of the present invention is to provide an improved "FIFO" accumulation table with a simple, rational and rather cost-effective solution.

These and other objects are achieved with the features of the invention described below.

In particular, one embodiment of the present invention provides an apparatus and related management system wherein the position of the item transfer deflector, along the table, is determined by the state of filling of the downstream conveyors, detected by transverse sensors and by the attainment of a height Q by the items on the outlet conveyor; said height Q is detected by a sensor S1 placed longitudinally to the outlet conveyor. Each time sensor S1 indicates the attainment of height Q by the items, the control unit redefines a new position of the deflector and a new height Q increased or decreased compared to the previous one as a function of the filling state of the downstream conveyors, detected by transverse sensors.

With this solution there are no movable elements for the detection of the items which come into contact with the items themselves, resulting in greater complexity of assembly and maintenance.

Another aspect of the invention is to provide a solution that requires a simple management, the positioning of the deflector being managed in a manner completely independent of the speed of the accumulation table conveyors. More precisely, the speed of the inlet conveyor is synchronized with the speed of the machine upstream, the speed of the outlet conveyor is synchronized with the speed of the machine downstream, while the speed of the deflector is independent of the speed of said conveyors.

Said objects and advantages are all achieved by the accumulation table object of the present invention, which is characterized by the following claims.

With this solution, the loading of the items on the table and thereby the accumulation thereof takes place without pressure.

BRIEF DESCRIPTION OF THE FIGURES

This and other features will become more apparent from the following description of some of the configurations, illustrated purely by way of example in the accompanying drawings.

DETAILED DESCRIPTION OF THE INVENTION

Figure 1:
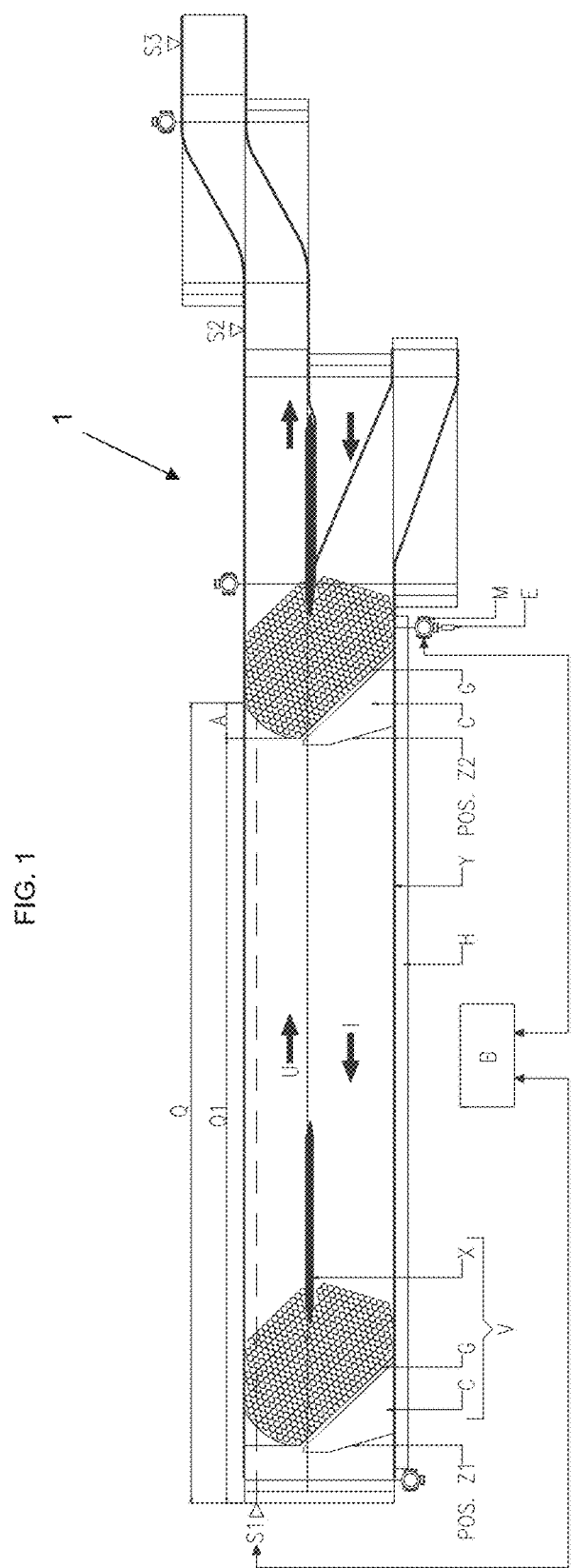
FIG. 1: shows a schematic plan view of the accumulation table.
Figure 2:
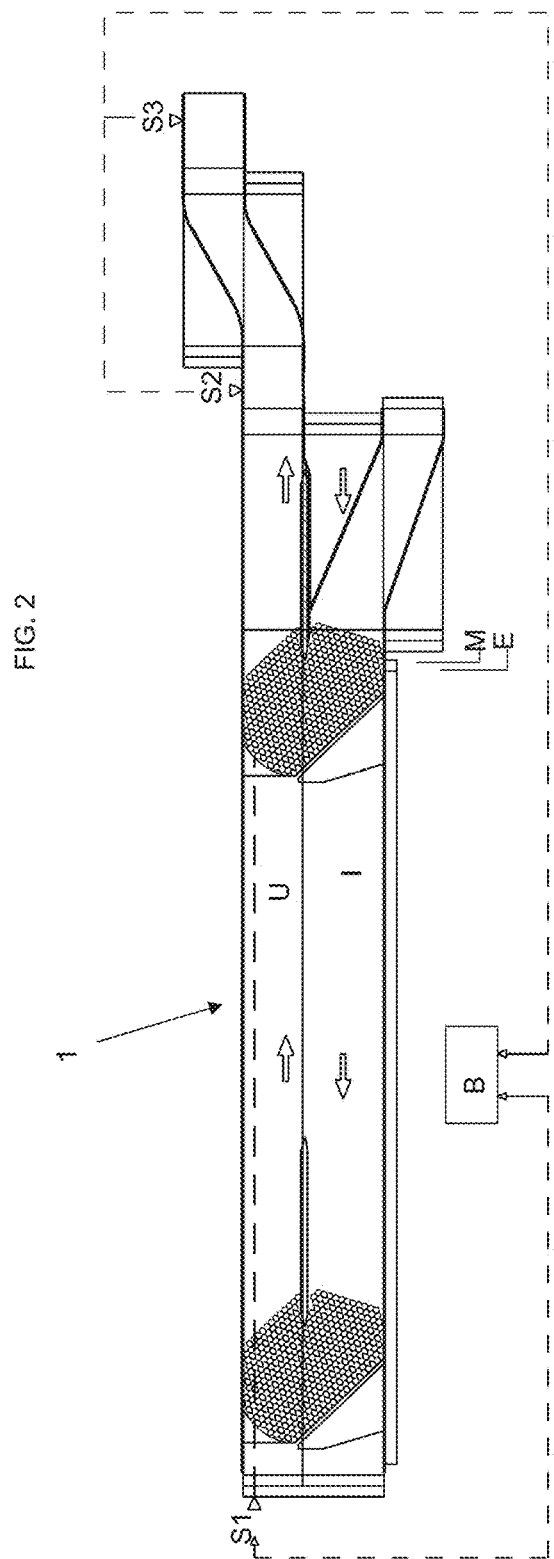
FIG. 2: shows a schematic plan view of the accumulation table in which the electrical components that interface with the control unit (B) are highlighted.
Figure 3:
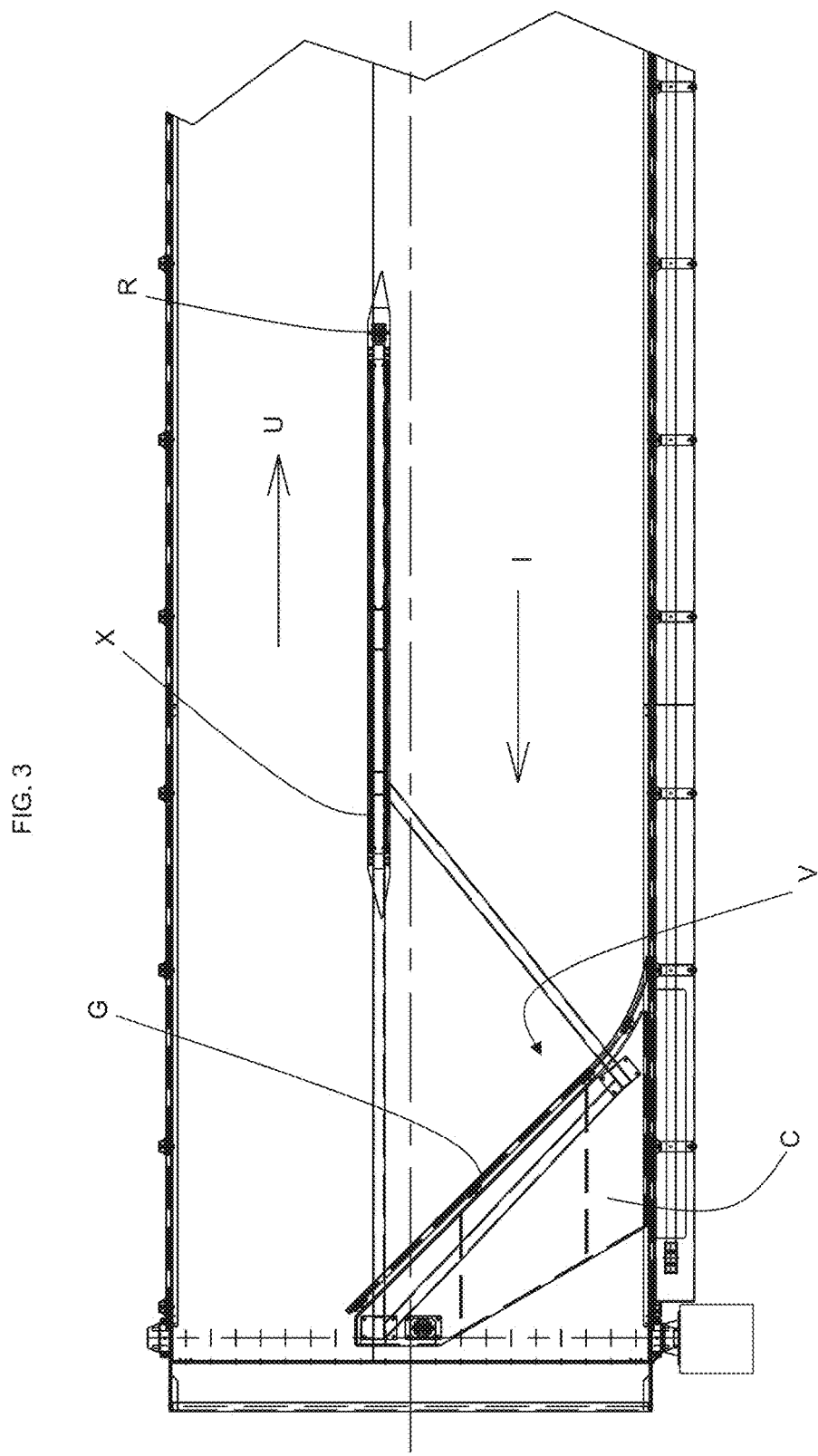
FIG. 3: shows an isometric view of the deflector (V).

With regard to the constructive features of the subject table, indicated as a whole with reference numeral 1, it is noted that said table 1 consists of an inlet conveyor I and an outlet conveyor U.

Said conveyors I, U:

Consist of parallel chains.

Are adjacent in contact, i.e. are side by side without the aid of the so-called "dead plate" and without the aid of any fixed central guide.

Are provided with independent drives adapted to impart a contrary motion thereto relative to one another.

The presence of a movable deflector V is also noted having longitudinal movement along conveyor I; means M for moving deflector V and means E for detecting the position thereof are provided are provided;

Said movable deflector V comprises a movable trolley C supporting a guide G transverse to conveyor I and a longitudinal separation guide X between conveyors I and U.

The movable trolley C abuts against the two longitudinal chains by means of wheels.

In particular, such a trolley C is moved on a side of the conveyor belt by means of a belt H; trolley C further supports the transverse guide G, the function of which is to transfer the items/containers/bottles from conveyor I towards conveyor U. In other words, such a transverse guide G is formed shaped so as to favor the transfer of packages from one conveyor to the other, thus from I to U; to this end, said transverse guide G comprises a flat surface arranged tilted that extends over the entire width of conveyor I and is shaped to determine a "zero" coupling with a fixed lateral guide Y. With this solution, the pressure of the items in accumulation on belt I in the transfer zone is reduced.

As mentioned above, trolley C is further provided with a longitudinal movable guide X, adapted to carry out the separation of the items between conveyors I, U having contrary motion. Such a guide X is projectingly supported by trolley C and is abutted against the chains of the table by means of wheels.

With the solutions described above, the items/containers/bottles are directed towards and transferred on belt U, and in particular in a reading area of a measurement sensor S1, preferably a laser sensor.

Said measurement sensor S1 is positioned at the upstream end of conveyor U, in proximity to an outer lateral side thereof, and is positioned so as to direct the beam according to a direction longitudinal to the side of conveyor U. It is noted that side of conveyor U means the side not adjacent to conveyor I.

In this way, said measurement sensor S1 is configured to intercept the items conveyed by deflector V and detect said distance, indicated with Q in the example. Said height Q, as will be shortly seen, is a limit reference value of the presence or absence of the items on the outlet belt U.

Table 1 is also provided with further sensors S2 and S3 and precisely:

- at least one pressure sensor S2, downstream of conveyor U, placed on the outlet side of conveyor U, respectively, adapted to detect the state of pressure of the items; by way of example, the sensor is in an "active" state if there is a pressure accumulation of the items on belt U, or an "inactive" state if there is no pressure condition, or if this is marginal,
- at least one presence sensor S3 placed on the sides of conveyor 1 and downstream of conveyor U adapted to detect the filling level.

Sensor S3 is that closer to the end, precisely placed in proximity to the end of belt U while sensor S2 is intermediate between sensor S1 and S3 and is always arranged on belt U but after the zone that can be covered by the movable guide X, when the deflector is in position Z2 according to the figure.

The speed of conveyor I is synchronized with the speed of the machine upstream.

The speed of conveyor U is synchronized with the speed of the machine downstream.

The speed of trolley C is independent of the speeds of I and U.

The table is provided with a control unit B configured to define a position Z of deflector V as a function of the previously mentioned value Q read by the measurement sensor S1 and the pressure value in the area of belt U, a value detected by sensor S2.

The control unit B is also configured to reset value Q that sensor S1 is intended to detect. In that regard, the operating principle of table 10 is now described.

Operating Principle

As said, the purpose of the table is to position deflector V according to the possible accumulation of items/containers/bottles to be carried out, for example if the downstream machine is not operating at full capacity or is stationary. In this case the upstream production, continuing to send items on conveyor I, requires a displacement of deflector V, via the drive M, so as to carry out the accumulation needed to not stop the whole system.

To this end, position Z of deflector V along the table is determined by the pressure condition of the items on the downstream conveyor U, as detected by the pressure sensor S2 and by the presence of bottles at a set reading height Q of the longitudinal sensor S1.

A) Loading Step

The loading of the table is predetermined by the condition of downstream conveyors filled detected by the presence sensor S3, which results in a slowing of conveyor U; if the pressure sensor S2 is engaged, such a condition involves stopping the outlet conveyor U, while the inlet conveyor I continues running, generating the loading of the table.

Deflector V is positioned at a height Z; guide G and guide X allow the transfer of packages to the reading area of sensor S1 and the consequent filling, without pressure, of the outlet conveyor U.

Sensor S1, detecting the presence of packages at a height less than or equal to Q, communicates a signal to the central unit B which detects it and, through motor M, causes a displacement of deflector V towards S1 (or in a direction of approach towards S1, with reference to the figure), bringing it to a new position Z; the control unit B resets the reading area of sensor S1 to a new height Q1 decreased by a value A with respect to the previous height Q such that the new measure Q1 is equal to Q1=Q-A such as to be out of the predetermined range.

When also a new height lower than or equal to Q1 will be occupied by the new items, the previous cycle will be repeated and a signal by sensor S1 and a new communication to the central unit B will be determined, which through motor M causes a new displacement of deflector V towards S1 to a new position Z; the control unit B resets the reading area of sensor S1 to a new height, such as to be out of the predetermined range, clearing a new reading area.

The progressive filling of the reading areas and the consequent displacement of deflector V to heights Z simultaneously to the outlet conveyor U stationary condition determines the overall filling of the table, up to position Z1 of the deflector, detected by the reading device E.

B) Emptying Step

The emptying of the table is predetermined by the condition of free downstream conveyors, detected by sensor S3 which determines the operation of conveyor U. In this condition, the outlet conveyor U is running and the inlet conveyor I is stationary or running (depending on the state of the upstream line). Deflector V is positioned at a height Z; guide G and guide X allow the transfer of packages to the reading area of sensor S1 and the consequent emptying, without pressure, of the outlet conveyor U.

When the "non-active" condition of the pressure sensor S2 occurs, i.e. not engaged and sensor S1 detects the absence of packages at the height greater than or equal to Q, this communicates a signal to the central unit B which detects it and, through motor M, causes a displacement of deflector V towards S2, away from S1 with reference to the figures, bringing it to a new position Z; the control unit B resets the reading area of sensor S1 to a new height Q1 increased by a value A with respect to the previous value Q such that the new measure Q1 is equal to Q1=Q+A such as to go out of the predetermined range, releasing a reading area.

When also the new reading area is cleared of items at a new height greater than or equal to Q1, the previous cycle will be repeated, i.e. a detection by sensor S1 and a new communication to the central unit B which, through motor M, causes a new displacement of deflector V towards S2 to a new position Z; the control unit B resets the reading area of sensor S1 to a new height, such as to go out of the predetermined range, clearing a new reading area.

The progressive emptying of the reading areas and the consequent displacement of deflector V to heights Z determines the overall emptying of the table, up to position Z2 of the deflector, detected by the reading device E.

The invention claimed is:

1. A table for accumulating FIFO items comprising:
an inlet conveyor and an outlet conveyor that are flat and parallel and positioned in contact, driven autonomously and having motion in opposite directions with respect to each other, wherein said inlet and outlet conveyors constitute a zone of transition and accumulation of a plurality of items, of which an accumulation surface adapted to receive said items is variable;
a deflector adapted to be longitudinally moved between two limit positions and provided with means adapted to transfer said items arranged on the inlet conveyor towards the outlet conveyor;
means for moving the deflector, in an accumulation direction or in an emptying direction, and means for detecting the position thereof;
wherein the following are positioned on the conveyor:
a measurement sensor, upstream of the outlet conveyor, having reading in a longitudinal direction and in proximity to an external lateral side of said outlet conveyor; the measurement sensor being configured for intercepting the items, signaling the presence thereof at a reading height wherein said height defines a limit reference zone for the presence or absence of the items on the outlet conveyor;
at least one pressure sensor, and a presence sensor at an exit of the outlet conveyor;
a control unit configured for collecting data provided by the measurement sensor, the pressure sensor, and the presence sensor, acting on the motorization and defining the position of the deflector along the table,
wherein the control unit is configured for:
moving the deflector along the table in the accumulation direction, closer to the measurement sensor, if the pressure sensor is active, and the measurement sensor signals the attainment of a height, by the items, less than or equal to a reference value set by said control unit; or,
moving the deflector along the table in the emptying direction, away from the measurement sensor, if the pressure sensor is not active and the measurement sensor signals the attainment of a height, by the items, greater than or equal to a reference value set by said control unit; and
in addition said control unit is configured for resetting a new height that the measurement sensor must detect, once the deflector is moved into a new position.

2. The table according to claim 1, wherein the deflector comprises a movable trolley configured for supporting a guide transverse to the inlet conveyor and a longitudinal movable guide.

3. The table according to claim 2, wherein the movable trolley is abutted against the inlet and outlet conveyors by means of wheels and is configured for being laterally moved by means of a belt placed on the side of the inlet conveyor.

4. The table according to claim 3, wherein the guide has a flat surface arranged tilted such to reduce the pressure of the items, wherein said guide is extended over the entire width of the inlet conveyor and is shaped in order to determine a "zero" coupling with a fixed lateral guide.

5. The table according to claim 3, wherein the longitudinal movable guide is arranged for making the separation between the inlet and outlet conveyors, the longitudinal movable guide being projectingly supported by the trolley and being abutted against chains of the table by means of wheels.

6. The table according to claim 1, wherein,
the presence sensor is the closest sensor to an outlet end of the table and is placed in proximity to an outlet end of the outlet conveyor; and
the pressure sensor is intermediate between the measurement sensor and the presence sensor and is always arranged on the outlet conveyor after a zone that can be covered by the movable guide, when the deflector is in a second position.

7. A table for accumulating FIFO items comprising:
an inlet conveyor and an outlet conveyor that are flat and parallel and positioned in contact, driven autonomously and having motion in opposite directions with respect to each other, wherein said inlet and outlet conveyors constitute a zone of transition and accumulation of a plurality of items, of which an accumulation surface adapted to receive said items is variable;
a deflector adapted to be longitudinally moved between two limit positions and provided with means adapted to transfer said items arranged on the inlet conveyor towards the outlet conveyor;
means for moving the deflector, in an accumulation direction or in an emptying direction, and means for detecting the position thereof;
wherein the following are positioned on the conveyor:
a measurement sensor, upstream of the outlet conveyor, the measurement sensor having reading in a longitudinal direction and in proximity to an external lateral side of said outlet conveyor, the measurement sensor being configured for intercepting the items, signaling the presence thereof at a reading height wherein said height defines a limit reference zone for the presence or absence of the items on the outlet conveyor;
at least one pressure sensor, and a presence sensor at an exit of the outlet conveyor;
a control unit configured for collecting data provided by the measurement sensor, the pressure sensor, and the presence sensor, acting on the motorization and defining the position of the deflector along the table,
wherein the deflector comprises a movable trolley configured for supporting a guide transverse to the conveyor and a longitudinal guide, the movable trolley being configured for being laterally moved by means of a belt placed on the side of the inlet conveyor, and
wherein the longitudinal movable guide is arranged for making the separation between the conveyors, the longitudinal movable guide being projectingly supported by the trolley and being abutted against chains of the table by means of wheels.

8. The table according to claim 7, wherein the control unit is configured for:
moving the deflector along the table in the accumulation direction, closer to the measurement sensor, if the sensor is active, and the measurement sensor signals the attainment of a height, by the items, less than or equal to a reference value set by said control unit; or,
moving the deflector along the table in the emptying direction, away from the measurement sensor, if the pressure sensor is not active and the measurement sensor signals the attainment of a height, by the items, greater than or equal to a reference value set by said control unit; and
in addition said control unit is configured for resetting a new height that the measurement sensor must detect, once the deflector is moved into a new position.

9. The table according to claim 7, wherein,
the presence sensor is the closest sensor to an outlet end of the table and is placed in proximity to an outlet end of the outlet conveyor; and
the pressure sensor is intermediate between the measurement sensor and the presence sensor and is always arranged on the outlet conveyor after a zone that can be covered by the movable guide, when the deflector is in a second position.

10. The table according to claim 7, wherein the guide having a flat surface arranged tilted such to reduce the pressure of the items, wherein said guide is extended over the entire width of the conveyor and is shaped in order to determine a "zero" coupling with a fixed lateral guide.

* * * * *